United States Patent
Salvador Marcos et al.

(10) Patent No.: US 9,576,403 B2
(45) Date of Patent: Feb. 21, 2017

(54) METHOD AND APPARATUS FOR FUSION OF IMAGES

(71) Applicant: THOMSON LICENSING, Issy de Moulineaux (FR)

(72) Inventors: Jordi Salvador Marcos, Hamburg (DE); Malte Borsum, Hannover (DE); Axel Kochale, Springe (DE)

(73) Assignee: THOMSON LICENSING, Issy de Moulineaux (FR)

( * ) Notice: Subject to any disclaimer, the term of this patent is extended or adjusted under 35 U.S.C. 154(b) by 0 days.

(21) Appl. No.: 14/408,161

(22) PCT Filed: May 30, 2013

(86) PCT No.: PCT/EP2013/061152
§ 371 (c)(1),
(2) Date: Dec. 15, 2014

(87) PCT Pub. No.: WO2013/186056
PCT Pub. Date: Dec. 19, 2013

(65) Prior Publication Data
US 2015/0147000 A1     May 28, 2015

(30) Foreign Application Priority Data

May 30, 2013  (WO) .................. PCT/EP2013/061152

(51) Int. Cl.
*G06K 9/36*  (2006.01)
*G06T 19/20*  (2011.01)
(Continued)

(52) U.S. Cl.
CPC ............. *G06T 19/20* (2013.01); *G06T 15/10* (2013.01); *H04N 5/23238* (2013.01);
(Continued)

(58) Field of Classification Search
CPC ............... H04N 5/2624; H04N 5/2628; H04N 5/23238; H04N 5/272; H04N 2013/0081;
(Continued)

(56) References Cited

U.S. PATENT DOCUMENTS 6,639,596 B1   10/2003  Shum et al.
7,750,936 B2    7/2010  Provinsal et al.
(Continued)

FOREIGN PATENT DOCUMENTS

CA        2386347       11/2002
JP     2000278683       10/2000
(Continued)

OTHER PUBLICATIONS

Snavely et al.: "Modeling the World from Internet Photo Collections"; Int. J. Comput. Vis. vol. 80 (2008), pp. 189-210; Jan. 30, 2007.
(Continued)

*Primary Examiner* — Ali Bayat
(74) *Attorney, Agent, or Firm* — Tutunjian & Bitetto, P.C.

(57) ABSTRACT

A method and an apparatus for improving a main image by fusing the richer information contained in a secondary image are described. A 3D structure of objects contained in the secondary image is retrieved and a parallax-corrected version of the secondary image is generated using the 3D structure. For this purpose a camera pose for which a projection of the 3D structure of the objects contained in the secondary image best resembles the perspective in the main image is determined and the parallax-corrected version of the secondary image is synthesized based on the determined camera pose. The parallax-corrected version of the secondary image is then fused with the main image.

12 Claims, 3 Drawing Sheets

Figure 1:
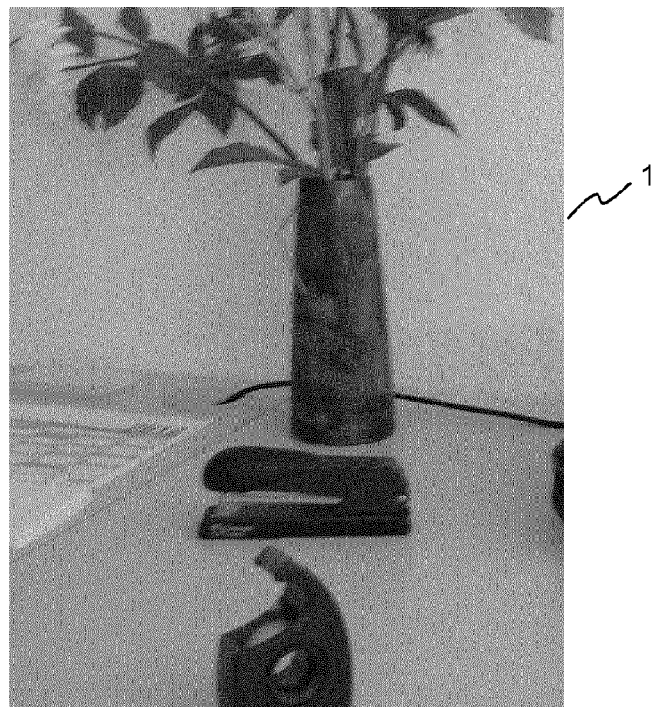

(51) Int. Cl.
  *H04N 5/262* (2006.01)
  *H04N 5/272* (2006.01)
  *G06T 15/10* (2011.01)
  *H04N 5/232* (2006.01)

(52) U.S. Cl.
  CPC ......... *H04N 5/2624* (2013.01); *H04N 5/2628* (2013.01); *H04N 5/272* (2013.01)

(58) Field of Classification Search
  CPC ...... H04N 2013/0239; H04N 2013/026; G06T 15/10; G06T 15/04; G06T 19/20; G06T 17/00; G06K 9/00704
  USPC ........................................................ 382/284
  See application file for complete search history.

(56) References Cited

U.S. PATENT DOCUMENTS

| | | |
|---|---|---|
| 2002/0180759 A1 | 12/2002 | Park et al. |
| 2003/0235344 A1 | 12/2003 | Kang et al. |
| 2006/0083440 A1* | 4/2006 | Chen .............................. 382/284 |
| 2010/0097444 A1* | 4/2010 | Lablans ........................... 348/46 |
| 2012/0162223 A1* | 6/2012 | Hirai et al. .................... 345/419 |
| 2012/0212573 A1 | 8/2012 | Park |
| 2013/0010073 A1* | 1/2013 | Do et al. ......................... 348/46 |

FOREIGN PATENT DOCUMENTS

| | | |
|---|---|---|
| WO | WO2006036398 | 4/2006 |
| WO | WO2010145499 | 12/2010 |

OTHER PUBLICATIONS

Scamarna et al.: "High-resolution image generation using warping transformations" (Abstract only); Source : Proceedings of the International Conference on Signal Processing and Multimedia Applications | 49-56 | 2009; Publication Date : Jul. 7, 2009; pp. 1-2.
Search Report Dated Jul. 23, 2013.

* cited by examiner

METHOD AND APPARATUS FOR FUSION OF IMAGES

This application claims the benefit, under 35 U.S.C. §365 of International Application PCT/EP2013/061152, filed May 30, 2013, which was published in accordance with PCT Article 21(2) on Dec. 19, 2013 in English and which claims the benefit of European patent application No. 12305681.4, filed Jun. 15, 2012.

The invention relates to a method and an apparatus for fusing images. More specifically, the invention refers to a method and an apparatus for seamlessly improving the visual quality and the level of detail of objects of interest in a large panoramic image by exploiting the richer information about these objects available in a separate view.

When exploring a panoramic image, it is sometimes desired to take a close look at a specific region containing certain objects of interest. In such a case the resolution provided by the panoramic image will often be insufficient when these objects are far from the camera. A straightforward solution for this problem would be to increase the resolution and reduce the exposure time of the panoramic capture set-up. However, this solution would require an enormous transmission bandwidth or storage capacity, which might render it unusable in practice. Furthermore, there are technological limits in the capabilities of current image sensors.

Alternatively, when a separate camera tracks the objects of interest and captures them with a higher level of detail, this complementary image can be fused with the panoramic image in order to provide an enhanced version of the objects of interest within the panorama. Related techniques can be classified as multi-image fusion or stitching. For example, document CA 2 386 347 describes a process for accurately combining low-resolution and high-resolution video streams into a single seamless display to a human observer. A panoramic visual sensor captures a panorama, whereas a further sensor captures detailed images. Both sensor are arranged as a fixed system. In order to reduce distractions from the boundary between low- and high-resolution video the two are smoothly blended in an annular region between the two. Fusion of the different resolution images only works well for intermediate distances from the sensors. At other depths misregistrations occur.

Figure 2:
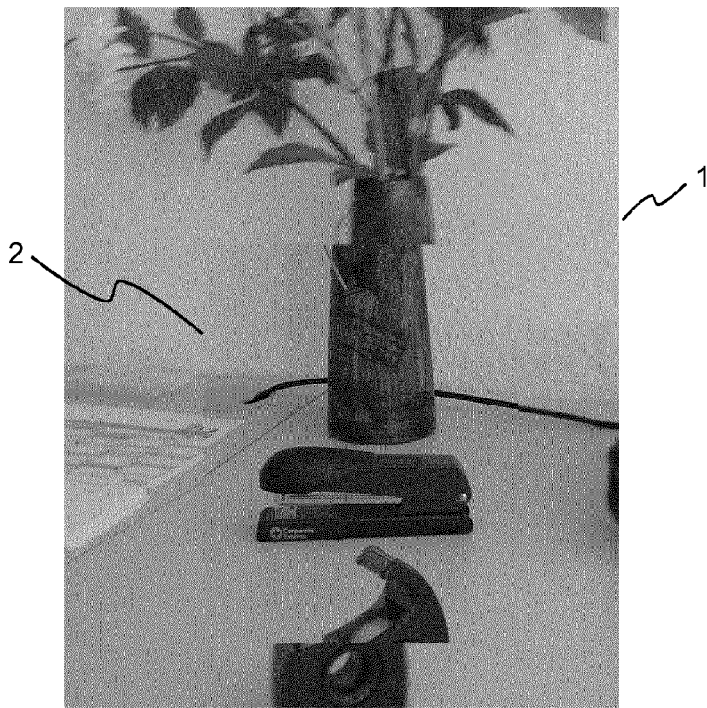

Generally, attempting to fuse information from an arbitrary viewpoint will generally result in an incorrect insertion of the additional high-quality visual data. This problem is illustrated in FIGS. 1 and 2. In this example a detailed view 2 has been inserted in a (panoramic) image 1 in order to match the position of the stapler. As can be seen, the perspective misalignment at the top and bottom of the inserted rectangle leads to dramatic artifacts.

In order to cope with this problem, US 2003/0235344 discloses a method for stitching two or more images. A relative depth of pixels in overlapping images is computed using plane sweep algorithms. This depth is used for image correction. The resulting images are then stitched. The solution described in this document only works for a limited subset of the cases where all images, i.e. the detailed views and the panoramic capture view, are at least approximately aligned so that rectification actually works. For fusing the images, stripes of pixels at different disparity levels, i.e. depth levels, are just blended, which may cause image distortions. Furthermore, an inverse warping stage is required, which might be source of further image distortions.

It is thus an object of the present invention to propose an improved solution for seamlessly fusing images.

According to the invention, a method for fusing a secondary image with a main image comprises the steps of:
  retrieving a 3D structure of objects contained in the secondary image;
  generating a parallax-corrected version of the secondary image using the 3D structure by determining a camera pose for which a projection of the 3D structure of the objects contained in the secondary image best resembles the perspective in the main image and synthesizing the parallax-corrected version of the secondary image based on the determined camera pose;
  fusing the parallax-corrected version of the secondary image with the main image.

One target scenario for the present invention is that of a static panoramic image capture set-up accompanied by a number of free high-definition cameras. These free high-definition cameras are stereo or, most desirable, plenoptic or light-field cameras. Such cameras allow arbitrarily changing the perspective parallax with minimal introduction of errors within a certain margin, limited by the physical implementation of the camera. By placing these cameras at a reasonably small distance from the main panoramic set-up, scene parallax in the high-detail capture of the object of interest can be compensated to resemble that of the panoramic capture. With the explicit exploitation of the 3D structure it becomes possible to seamlessly fuse detailed views of the objects of interest with the panoramic image. Of course, the panoramic image is not necessarily a static image. It may likewise contain moving objects. An example for this is a sports arena, in which the athletes are moving against an essentially static background.

An application for the above scenario works as follows. The user interactively selects for display a region in the panorama containing one or more objects of interest. These objects are automatically or interactively segmented from the background. Then a second image, containing a high-detail capture of the objects of interest, is parallax-corrected in order to fit in the panoramic perspective. Finally, the objects of interest in the panorama are replaced by the transformed (rotated, translated, scaled) high-detail versions and the borders are conveniently blended in order to provide a smooth integration in the panorama's background.

The increasing spread of mainstream stereo and light-field cameras and the upcoming wide availability of 3D contents enables further target scenarios for the present invention. For example, sets of stereo images gathered from a data-base, e.g. internet, may be stitched for constructing high-quality panoramas. Also, the contents of interest of an image may be improved using similar contents with better visual quality from a different image containing said objects, regardless of the parallax differences between the images.

Figure 3:
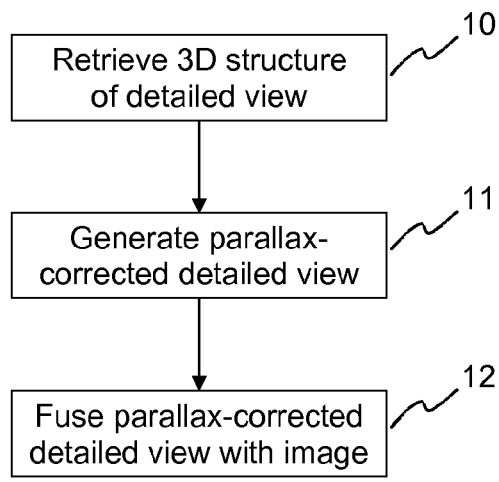
Figure 4:
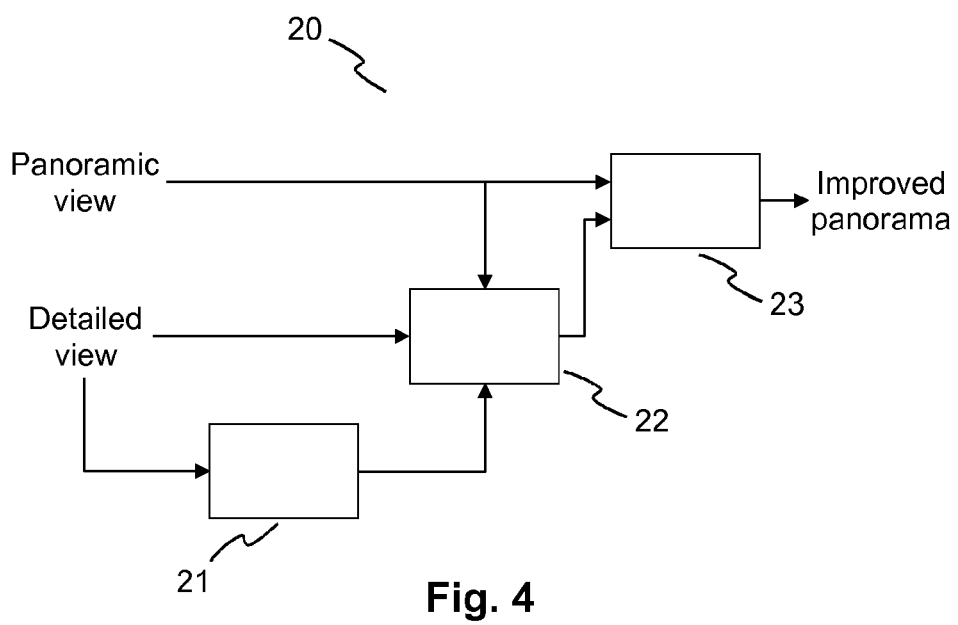
Figure 5:
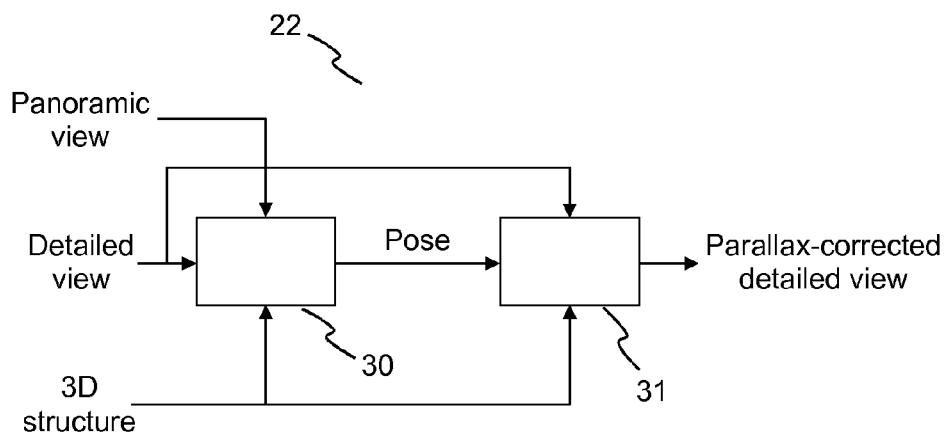
Figure 6:
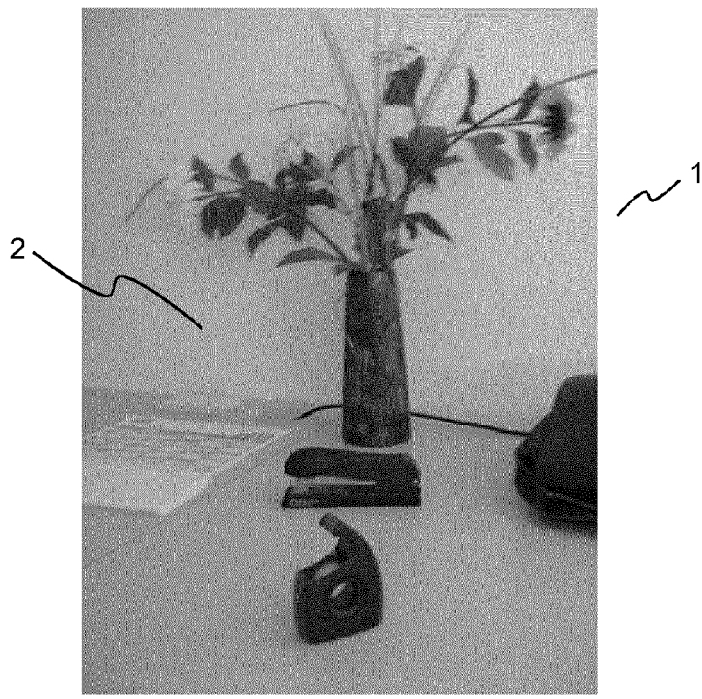

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

FIG. 1 shows an original blurred region selected from a panoramic image,

FIG. 2 shows the region of FIG. 1 after insertion of the richer data from a detailed view, FIG. 3 illustrates a method according to the invention for fusing images, FIG. 4 schematically depicts an apparatus implementing the method of FIG. 3, FIG. 5 shows a parallax-correction stage of the apparatus of FIG. 4 in more detail, and FIG. 6 depicts a smoothly fused image obtained using the apparatus of FIG. 4.

FIG. 1 shows an original slightly blurred region 1 selected from a panoramic image. In FIG. 2 a more detailed image 2 has been inserted in the region 1. As can be seen, the perspective misalignment at the top and bottom of the inserted detailed image 2 leads to dramatic artifacts.

FIG. 3 illustrates a method according to the invention for fusing images, which avoids or at least reduces such artifacts. In a first step the 3D structure of the detailed view is retrieved 10 using the information that is available for the detailed view. For example, the 3D structure is retrieved using a depth channel provided by a pair of stereo cameras, a light-field description provided by plenoptic or light-field cameras, etc. Then, given a region interactively selected by the viewer in a large panoramic view and the 3D structure extracted from the detailed view, a parallax-corrected version of the detailed view is produced 11, which matches the perspective seen from the viewpoint of the panorama. With this, data from the parallax-corrected view can be used to seamlessly integrate 12 the richer data from the detailed view into the panorama.

An apparatus 20 that implements the above solution is schematically depicted in FIG. 4. In a 3D structure retrieval stage 21 the 3D structure of the scene is retrieved from the detailed auxiliary view. For stereo setups this can be done with any of the existing stereo reconstruction techniques. In case of data captured by a light-field camera, more sophisticated procedures are preferably used, such as Structure from Motion as described by N. Snavely et al.: "Modeling the World from Internet Photo Collections", Int. J. Comput. Vis. Vol. 80 (2008), pp. 189-210, in order to automatically process the large number of available views in a light-field capture without requiring a dedicated calibration of the setup. In either case, the output of this stage contains a 3D description of the scene captured by the auxiliary setup, e.g. as a depth value for each pixel.

A parallax correction stage 22 is provided for generating a parallax-corrected detailed view. The parallax correction stage 22 comprises two sub-stages, as illustrated in FIG. 5. The first sub-stage, a pose estimator 30, finds the camera pose, i.e. the camera position and orientation, for which the projection of the 3D structure of the detailed view best resembles the perspective in the panoramic view. A view synthesizer 31 then performs a photo-realistic warping of the detailed view with the camera pose obtained in the first sub-stage 30.

The pose estimator 30 preferably implements a robust technique, like RANSAC (RANdom SAmple Consensus), i.e. pose estimation is accomplished by checking the projection error of salient points between the warped detailed view and the panoramic view. The pose model to optimize consists of 10 parameters: focal length (1: f), optical center misalignment (2: $c_x$ and $c_y$), rotation (4: see below) and translation (3: $t_x$, $t_y$ and $t_z$). A few assumptions allow to simplify the pose model. It is assumed that the panoramic image is free from skewness errors, i.e. the skew coefficient equals zero. Furthermore, it is assumed that the vertical and horizontal focal lengths are equal and the lens distortion is negligible, which is reasonable for the case of interest where, due to the large zoom setting, the focal length is large.

The resulting pose model can be described with the help of the calibration matrix K as:

$$P = K(R|T) = \begin{pmatrix} fs_x & 0 & c_x \\ 0 & fs_y & c_y \\ 0 & 0 & 1 \end{pmatrix} \begin{pmatrix} r_{1x} & r_{2x} & r_{3x} & t_x \\ r_{1y} & r_{2y} & r_{3y} & t_y \\ r_{1z} & r_{2z} & r_{3z} & t_z \end{pmatrix},$$

Where R is the rotation matrix and T is the translation vector. The rotation matrix R can be parameterized by four parameters through the use of the Rodrigues' rotation formula: given a unit vector $(u_x, u_y, u_z)$, where $u_x^2+u_y^2+u_z^2=1$, the matrix R for a rotation by an angle of θ about an axis in the direction of said vector is $$R = \begin{bmatrix} \cos\theta + u_x^2(1-\cos\theta) & u_x u_y(1-\cos\theta) - u_z\sin\theta & u_x u_z(1-\cos\theta) + u_y\sin\theta \\ u_y u_x(1-\cos\theta) + u_z\sin\theta & \cos\theta + u_y^2(1-\cos\theta) & u_y u_z(1-\cos\theta) - u_x\sin\theta \\ u_z u_x(1-\cos\theta) - u_y\sin\theta & u_z u_y(1-\cos\theta) + u_x\sin\theta & \cos\theta + u_z^2(1-\cos\theta) \end{bmatrix}.$$

The pixel position x of a 3D point X with the pose transformation P is obtained by the two following operations:

$$x' = \begin{pmatrix} x' \\ y' \\ z' \end{pmatrix} = PX$$

and $$x = \begin{pmatrix} x'/z' \\ y'/z' \end{pmatrix}.$$

The view synthesizer 31 preferably performs light-field rendering, when the auxiliary view is of this type, or image based rendering in more conventional stereo capture setups. The output of view synthesizer 31 is the parallax-corrected detailed view, which can now be easily fused in the panoramic view.

For this purpose an image fusion stage 23 replaces the contents inside the silhouettes of the objects of interest in the panoramic view with by the high-detail warped view generated by the parallax correction stage 22. Then, a small area around the borders of the silhouette, e.g. ±2 pixels in the normal direction, is used to smoothly interpolate the discontinuity between the fine detail of the warped view and the blurry background from the panoramic view. In more favorable scenarios, i.e. with similar viewpoints for both the panoramic and the detailed view, this process can be done for both the objects of interest and the background around them. In such case, the silhouette corresponds to the image area of the detailed view, and the smooth interpolation is carried on the contour of such rectangle. Such an example is shown in FIG. 6, which was obtained using the apparatus of FIG. 4.

The invention claimed is:

1. A method for fusing a secondary image with a main image, the method comprising:
retrieving a 3D structure of objects contained in the secondary image by using information available for the secondary image;
generating a parallax-corrected version of the secondary image using the 3D structure by determining a camera pose for which a projection of the 3D structure of the objects contained in the secondary image resembles the perspective in the main image and synthesizing the parallax-corrected version of the secondary image based on the determined camera pose; and fusing the parallax-corrected version of the secondary image with the main image.

2. The method according to claim 1, wherein the 3D structure of the secondary image is retrieved from depth information or a light-field description provided for the secondary image.

3. The method according to claim 1, wherein the parallax-corrected version of the secondary image is synthesized by performing a photo-realistic warping of the secondary image.

4. The method according to claim 1, further comprising interpolating a boundary region between the main image and the fused parallax-corrected version of the secondary image.

5. The method according to claim 1, wherein the main image is a panoramic image and the secondary image is a more detailed image of an object in the panoramic image.

6. The method according to claim 1, wherein the main image and the secondary image are two images of a set of images.

7. An apparatus for fusing a secondary image with a main image, the apparatus comprising at least one processor configured to:

retrieve a 3D structure of objects contained in the secondary image by using information available for the secondary image;

generate a parallax-corrected version of the secondary image using the 3D structure by determining a camera pose for which a projection of the 3D structure of the objects contained in the secondary image resembles the perspective in the main image and to synthesize the parallax-corrected version of the secondary image based on the determined camera pose; and fuse the parallax-corrected version of the secondary image with the main image.

8. The apparatus according to claim 7, wherein the at least one processor is further configured to retrieve the 3D structure of the secondary image from depth information or a light-field description provided for the secondary image.

9. The apparatus according to claim 7, wherein the at least one processor is further is configured to synthesize the parallax-corrected version of the secondary image by performing a photo-realistic warping of the secondary image.

10. The apparatus according to claim 7, wherein the at least one processor is further configured to interpolate a boundary region between the main image and the fused parallax-corrected version of the secondary image.

11. The apparatus according to claim 7, wherein the main image is a panoramic image and the secondary image is a more detailed image of an object in the panoramic image.

12. The apparatus according to claim 7, wherein the main image and the secondary image are two images of a set of images.

* * * * *